Oct. 22, 1963
S. M. BAGNO
3,108,271
STABILIZATION OF SENSITIVITY IN INTRUDER DETECTION SYSTEMS
Filed March 16, 1960
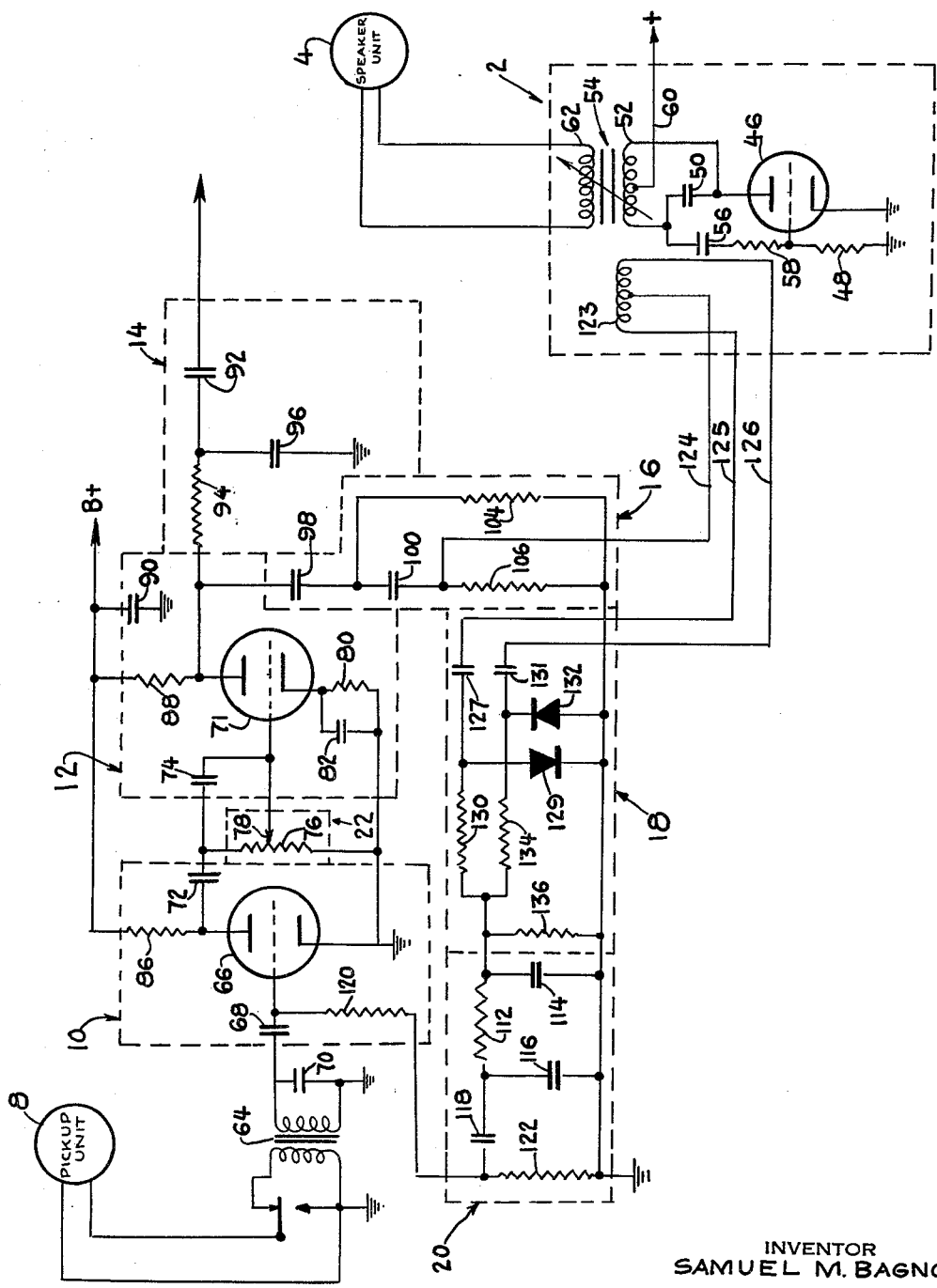
INVENTOR
SAMUEL M. BAGNO
BY
*Gerald Warshavsky*
AGENT 3,108,271
STABILIZATION OF SENSITIVITY IN INTRUDER
DETECTION SYSTEMS
Samuel M. Bagno, Belleville, N.J., assignor to Specialties
Development Corporation, Belleville, N.J., a corporation of New Jersey
Filed Mar. 16, 1960, Ser. No. 15,441
4 Claims. (Cl. 343—8)

The present invention relates to an intruder detection system which functions by receiving radiations emanating or reflecting from a moving object, and, more particularly, to such a system which is an improvement over the type of system disclosed in United States Patents 2,655,645, October 13, 1953, and 2,794,974, June 4, 1957.

In the systems of the above patents, a space to be protected is filled with radiations of a given comparatively high frequency or frequencies by transmitting such radiations into the space to be reflected from walls or objects in the space. Motion within the space is detected by receiving the reflected radiations and comparing their frequency with the frequency of the transmitted radiations. If no motion occurs within the space, the frequency of the received radiations will be the same as the frequency of the transmitted radiations. If there should be motion in the room, however, the waves reflected from or otherwise affected by the moving object will have a frequency different from the transmitted frequency, the frequency change usually being due to a Doppler effect and hence being termed the Doppler frequency.

To detect the presence or absence of such Doppler frequencies the received signal is beat with the transmitted signal in a mixer or modulator. If the frequency of the received radiations differ from the frequency of the transmitted radiations, the output of the mixer will contain a Doppler frequency signal having a frequency equal to the difference between the frequencies of the transmitted and received radiations. The Doppler frequency signal is separated from the other signals present in the mixer output and is utilized to initiate an alarm.

Since an intruder moves at a much slower rate than do the transmitted radiations, the Doppler effect of the moving intruder causes a very small percentage variation in the frequency of the received radiations. For example, if sound energy having a frequency of 20,000 c.p.s. is reflected from an intruder moving at one foot per second, the Doppler effect of the motion of the intruder would cause the received frequency to differ from that transmitted by only 18 cycles per second.

In the systems of the above patents, the transmitted and received signals are mixed in a conventional diode modulator, therefore, when the received signal was displaced in phase from the transmitted signal by 180 degrees, the stronger transmitted frequency signal would tend to cancel out the received frequency signal and the Doppler frequency output of the mixer would be of very low amplitude. Under these conditions the sensitivity of the system is greatly reduced and an intruder could move without detection until the phase of the received signal changed.

Accordingly, it is an object of the present invention to provide an intruder detection system which is not subject to the aforementioned difficulties.

Another object is to provide such a system, the sensitivity of which is not affected by the phase relationship between the transmitted and received signals.

Another object is to provide improved means for determining the difference in frequency between two signals.

Another object is to provide such means wherein the difference in phase between the input signals is compensated for.

A further object is to provide such means in a simple and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

The single FIGURE is a schematic diagram of a detection system in accordance with the present invention.

Referring to the drawing in detail there is shown an intruder detection system in accordance with the present invention in which an oscillator unit 2 generates energy at a predetermined high frequency, preferably but not necessarily in the ultrasonic range, which is transmitted into the space to be protected by means of a transducer 4. That energy traverses the space to be protected, is reflected from objects therein and is received and converted into electrical signals by a receiving transducer 8. If there is no movement in the space being protected, the frequency received by the pick-up unit 8 will be identical with that transmitted by the speaker unit 4. On the other hand, if there is motion in the space being protected the signal from the pickup 8 will be composed of the transmitted frequency plus frequencies differing therefrom by a given amount depending on the rapidity of the motion.

These signals, all substantially at a high frequency in the ultrasonic range or above, are amplified by first and second reflex amplifier stages 10 and 12. Connected to the second reflex amplifier stage 12, and defining two independent paths therefrom, are a low pass filter 14 and a high pass filter 16. The low pass filter 14 rejects signals having a frequency in the range of the transmitted signals, whereas the high pass filter 16 permits such signals to pass therethrough. Consequently the amplified signals in the ultrasonic range pass through the high pass filter 16 to a mixer detector 18, the latter also having an input from the oscillator 2. In the mixer and detector 18, the received signals are beat against a frequency corresponding to that of the transmitted energy, and the resultant difference frequency is detected. If the received and transmitted energy are both at the same frequency, there is no difference frequency and consequently the Doppler output from the mixer and detector 18 is zero. On the other hand, if the received signals include frequencies which differ from the transmitted frequency, then there will be an output of the mixer and detector 18 at a frequency equal to the difference between the transmitted and received frequencies. The difference frequency is the Doppler frequency.

The output of the mixer and detector 18 goes to a low pass filter 20 which permits the difference frequency to pass, but which will not pass the high frequencies actually received by the pickup unit 8. That difference frequency, hereinafter termed the Doppler signal, returns to the first reflex amplifier 10, where it is amplified. From there it goes to the second reflex amplifier 12 via a sensitivity control 22, the circuitry being such that the sensitivity control 22 is active substantially only on the Doppler signal and not on the high frequency signal. Since the Doppler signal is at a comparatively low frequency, for example, below 100 cycles per second, it is rejected by the high pass filter 16 but goes from amplifier stage 12 through the low pass filter 14 to appropriate alarm control circuitry (not shown) which initiates an alarm in response to the presence of a Doppler frequency signal.

Referring now to the circuit in detail, the oscillator 2 comprises a tube 46 the cathode of which is connected to ground, the grid of which is connected to ground by a 47,000 ohm resistor 48, the plate of which feeds a tuned circuit including a .0015 mf. condenser 50 and the primary winding 52 of a stepdown transformer 54, the grid being coupled to that tuned circuit by a .001 mf. condenser 56 and a 22,000 ohm resistor 58. Suitable positive potential is applied to the plate of the tube 46 via a lead 60 center-tapped to the primary winding 52. The secondary winding 62 of the transformer 54 is connected to the speaker unit 4.

The pickup unit 8 is connected to the first reflex amplification stage 10 by means of transformer 64, the amplification stage 10 being accomplished by means of tube 66 (one half of a 6SL7 tube) the cathode of which is connected to ground and the grid of which is connected to the cathode by means of a 200 mmf. condenser 68 and the secondary winding of the transformer 64, that secondary winding being tuned by a 200 mmf. condenser 70. The plate of the tube 66 is coupled to the grid of the tube 71 (one half of a 6SL7 tube) by a .05 mf. condenser 72 and a 500 mmf. condenser 74 in series, a 1 megohm resistance 76 is connected between ground and a point between the condensers 72 and 74, and a movable contact 78 bypasses the condenser 74. The value of the condensers 72 and 74 is such that high frequency signals, in the ultrasonic range or above, will pass through the condenser 74, whereas the Doppler frequencies will not. The potentiometer defined by the resistor 76 and the movable contact 78 thus constitutes the sensitivity control 22, and that control will be effective substantially only on the Doppler frequencies.

The cathode of the tube 71, which provides the second amplification stage 12, is connected to ground via 4700 ohm resistor 80 bypassed by a .1 mf. condenser 82. Suitable positive potential is applied to the anodes of the tubes 66 and 71 via resistors 86 and 88 respectively, the resistor 86 having a value of 270,000 ohms and the resistor 88 having a value of 180,000 ohms. The B+ line is bypassed to ground by a 40 mf. capacitor 90.

The low pass filter 14 includes a .1 mf. condenser 92 in series with a 510,000 ohm resistor 94, and a .01 mf. bypass condenser 96 connected between ground and a point between the condenser 92 and the resistor 94. The high pass filter 16 is defined by 500 mmf. condensers 98 and 100, with 510,000 ohm resistors 104 and 106 connected between the junction of the condensers and ground and between the condenser 100 and ground, respectively. Both of the filters 14 and 16 are connected to the plate of the second reflex amplifier tube 71.

The signals initially received are at a high frequency, here specifically disclosed as in the ultrasonic range. Therefore they will not pass through the low pass filter 14, but they will pass through the high pass filter 16.

The received high frequency signals passed by the filter 16 and the high frequency signals produced by the oscillator are mixed or beat together in a novel manner as described in detail hereinafter to produce at the output of the mixer detector 18 a signal having a frequency component equal to the difference in the frequencies of the transmitted and received signals. The low pass filter 20 which follows, and which will pass only low frequencies in the Doppler range, which Doppler frequencies will be present only when the received frequencies differ from the transmitted frequencies by a predetermined amount, consists of a 220,000 ohm resistor 112 and .01 mf. condensers 114 and 116, the output from the low pass filter 20 being coupled to the grid of the amplifier tube 66 by a .02 mf. condenser 118 and a 220,000 ohm resistor 120, a 10 megohm resistor 122 being connected between ground and the point between the condenser 118 and the resistor 120.

The Doppler frequency signals, if present, will then be amplified by the tubes 66 and 71, these low frequency signals will be affected by the setting of the sensitivity control 22, and these low frequency signals will pass through the low pass filter 14.

The portion of the circuit described in detail to this point operates in substantially the same manner as the corresponding portions of the circuits described in the aforementioned patents, which as previously mentioned utilized as the mixer a conventional diode modulator resulting in decreased sensitivity whenever the received and transmitted signals were 180 degrees out of phase.

The present invention overcomes this problem of sensitivity due to the phase of the received signal in the manner about to be described.

The transformer 54 in the oscillator 2 is provided with a second output winding 123 which is center tapped to provide two outputs of opposite phase. The output of the high pass filter 16, which is taken from the junction of the condenser 110 and the resistor 106, is connected by means of a conductor 124 to a center tap on the transformer winding 123. The received signal, therefore, is added to one of the outputs of the winding 123 and is subtracted from the other of these outputs, depending on its phase. The outputs of the winding 123 are respectively connected through conductors 125 and 126 to the mixer 18. In the mixer 18, the output of the conductor 125 is fed through a 100 mmf. condenser 127 and is positively rectified by a diode 129 to produce a series of negative half waves across a 220,000 ohm resistor 130, and the output on the conductor 126 is fed through a 100 mmf. condenser 131 and is negatively rectified by a diode 132 to produce a series of positive half waves across a resistor 220,000 ohm 134. These half wave signals across resistors 130 and 134 each vary in amplitude in accordance with the Doppler frequency, the amplitude of one of these half wave signals increasing in accordance with the Doppler frequency and the amplitude of the other half wave signal decreasing in accordance with the Doppler frequency due to the 180 degree phase difference between the transmitted signal components of the outputs of the winding 123. The half wave signals appearing across the resistors 130 and 134 are both fed through a 1 megohm resistor 136 and the signal resulting from their combination is fed into the low pass filter 20.

When the received signal has a phase of 0 or 180 degrees with respect to the transmitted signal, the inputs to the mixer 18 (formed by adding, within the winding 123, the received signal to each of the oscillator outputs) are 180 degrees out of phase, one of these inputs being of increased amplitude and the other being of decreased amplitude, as a result of the effect of the received signal which is in phase with one of the oscillator output and out of phase with the other oscillator output. Under these conditions the positive half cycles of one of the inputs occur at the same instant as the negative half cycles of the other input. Therefore, the half wave signals across the resistors 130 and 134 occur simultaneously, and since they are of opposite sign they subtract to produce the resultant signal across resistor 136. Since the amplitude of one of these signals increases in one direction while the amplitude of the other is decreasing in the opposite direction, in accordance with the Doppler frequency, the signal resulting from their combination experiences large changes in amplitude in response to the presence of a Doppler frequency component in the half wave signals.

When the phase of the received signal is displaced from the phase of the transmitted signal by other than 0 or 180 degrees, there is a lesser difference in the amplitudes of the signals appearing across resistors 130 and 134, however, the phases of these half wave signals are then such that the negative half wave signal is displaced from the positive half wave signal and therefore the two signals do not cancel each other when combined.

From the foregoing description it can be seen that the present invention provides an improved intruder detection system in which a difference in phase between the transmitted and received signals is compensated for.

While the invention has been described with reference to a Doppler frequency detection system operating on a transmitted frequency in the ultrasonic range, it is apparent that the invention could be applied to Doppler frequency detection systems utilizing transmitted frequencies in other ranges, and could be applied in systems other than Doppler effect detection systems.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a detection system including means for radiating energy of a given frequency into a space and means for receiving the frequencies as modified by disturbances in the space; improved means for determining the difference in frequency between the radiated and received frequencies comprising means for providing two electrical output signals displaced in phase and having the frequency of the radiated energy, means for individually modulating the received signal with each of said output signals and for providing individual positive and negative going resultant signals and means for combining said positive and negative signals, whereby the signal produced by combining said resultant signals contains a difference frequency component of substantial amplitude throughout variations of the phase relationship of the radiated and received signals.

2. In a detection system including means for radiating energy of a given high frequency into a space and means for receiving the frequencies as modified by disturbances in the space; improved means for determining the difference in frequency between the radiated and received frequencies comprising means for providing two electrical output signals displaced in phase by 180 degrees and having the frequency of the radiated energy, rectifying means for individually modulating the received signal with each of said output signals to provide individual positive and negative going resultant signals each varying in amplitude at a rate equal to the frequency difference between the radiated and received signals, and means for combining said positive and negative resultant signals, whereby the signal produced by combining said resultant signals contains a difference frequency component of substantial amplitude throughout variations of the phase relationship of the radiated and received signals.

3. The method of determining the difference in frequency between energy radiated into a space and the reflections of said energy as modified by disturbances in the space, which method comprises the steps of providing two electrical output signals displaced in phase and having the frequency of the radiated energy, modulating the reflected energy with each of said output signals to produce a positive going difference frequency signal and a negative going difference frequency signal, combining said positive and negative signals to produce a resultant signal containing a difference frequency component of substantial amplitude throughout phase variations of the radiated and reflected energy, and removing from said resultant signal all components other than said difference frequency component.

4. The method of determining the difference in frequency between energy radiated into a space and the reflections of said energy as modified by disturbances in the space, which method comprises the steps of providing two electrical output signals displaced 180 degrees in phase and having the frequency of the radiated energy, modulating the reflected energy with each of said output signals to produce a positive half wave difference frequency signal and a negative half wave difference frequency signal, combining said positive and negative half wave signals to produce a resultant signal containing a difference frequency component of substantial amplitude throughout phase variations of the radiated and reflected energy, and removing from said resultant signal all components other than said difference frequency component.

References Cited in the file of this patent

UNITED STATES PATENTS

| | | |
|---|---|---|
| 2,794,974 | Bagno et al. | June 4, 1957 |
| 2,841,707 | McCulley | July 1, 1958 |
| 2,908,868 | Jensen et al. | Oct. 13, 1959 |
| 2,933,980 | Moore et al. | Apr. 26, 1960 |
| 2,947,806 | Davis | Aug. 2, 1960 |